US012759472B2

(12) United States Patent
Goris

(10) Patent No.: US 12,759,472 B2
(45) Date of Patent: Oct. 13, 2026

(54) MOUNTING DEVICE

(71) Applicant: VOLVO TRUCK CORPORATION, Gothenburg (SE)

(72) Inventor: Christopher David Goris, Lexington, NC (US)

(73) Assignee: Volvo Truck Corporation, Gothenburg (SE)

( * ) Notice: Subject to any disclaimer, the term of this patent is extended or adjusted under 35 U.S.C. 154(b) by 157 days.

(21) Appl. No.: 18/636,860

(22) Filed: Apr. 16, 2024

(65) Prior Publication Data

US 2025/0319825 A1 Oct. 16, 2025

(51) Int. Cl.
*B60R 11/00* (2006.01)

(52) U.S. Cl.
CPC ....... *B60R 11/00* (2013.01); *B60R 2011/0052* (2013.01)

(58) Field of Classification Search
CPC ........................................................ B60R 11/00
USPC ...................................................... 248/221.12
See application file for complete search history.

(56) References Cited

U.S. PATENT DOCUMENTS 4,056,250 A * 11/1977 Uchiyama ............... E02F 3/382 37/379
8,413,940 B2 4/2013 Krause et al.

FOREIGN PATENT DOCUMENTS

| | | | | |
|---|---|---|---|---|
| CN | 110139769 A | | 8/2019 | |
| DE | 102017009176 A1 | | 4/2018 | |
| EP | 2474444 B1 | | 7/2012 | |
| EP | 2768687 B1 | | 6/2019 | |
| EP | 3988359 B1 | | 4/2022 | |
| WO | WO-2013058699 A1 | * | 4/2013 | ........... B60K 15/067 |
| WO | 2022199985 A1 | | 9/2022 | |

OTHER PUBLICATIONS

European Search Report (Jun. 27, 2025) for corresponding European App. 25169412.1.

* cited by examiner

*Primary Examiner* — Anita M King
(74) *Attorney, Agent, or Firm* — Withrow & Terranova, PLLC

(57) ABSTRACT

A mounting device includes a first bracket including a first leg of the first bracket, the first leg of the first bracket including a first notch and a second notch remote from the first notch, a second bracket including a first leg of the second bracket, and a locking arrangement attached to the first leg of the second bracket, the locking arrangement including a first pin having a first hole extending therethrough generally perpendicularly to a length dimension of the first pin, a second pin having a second hole extending therethrough generally perpendicularly to a length dimension of the second pin, an elongated member extending through the first hole and the second hole, and an arrangement for moving the first pin and the second pin toward and away from each other, the first pin being receivable in the first notch and the second pin being receivable in the second notch.

19 Claims, 13 Drawing Sheets

MOUNTING DEVICE

TECHNICAL FIELD

The disclosure relates generally to mounting devices. The disclosure is presently believed to have particular applicability to heavy-duty vehicles, such as trucks, buses, and construction equipment, among other vehicle types, but is not limited to vehicles.

BACKGROUND

In various truck configurations it is desirable to bring large, sub-assembled components, such as battery boxes and fuel tanks, to the mainline truck assembly area and simply hook them to the frame rails. The current “hook and hang” solutions are very cumbersome and time consuming.

It is desirable to simplify the design and installation complexity of current hook and hang mounting techniques.

SUMMARY

According to a first aspect of the disclosure, a mounting device comprises a first bracket comprising a first leg of the first bracket, the first leg of the first bracket comprising a first notch and a second notch remote from the first notch, a second bracket comprising a first leg of the second bracket, and a locking arrangement attached to the first leg of the second bracket, the locking arrangement comprising a first pin having a first hole extending therethrough generally perpendicularly to a length dimension of the first pin, a second pin having a second hole extending therethrough generally perpendicularly to a length dimension of the second pin, an elongated member extending through the first hole and the second hole, and means for moving the first pin and the second pin toward and away from each other, the first pin being receivable in the first notch and the second pin being receivable in the second notch.

A technical benefit may include facilitating the mounting of two objects relative to each other.

Optionally in some examples, including in at least one preferred example, the moving means comprises a drawbolt having a threaded end and a headed end at an opposite end of the drawbolt from the threaded end, the first hole in the first pin being a threaded hole in which the threaded end is disposed, the drawbolt extending through the second hole so that the headed end of the drawbolt is disposed on a side of the second pin opposite from the first pin.

A technical benefit may include simplifying the structure of and technique for mounting two objects, particularly large objects, relative to each other.

Optionally in some examples, including in at least one preferred example, the locking arrangement comprises a third pin having a threaded hole in which the threaded end is disposed, the third pin being disposed between the first pin and the second pin along the drawbolt, and the first leg of the first bracket comprises a third notch between the first notch and the second notch.

A technical benefit may include providing additional structural support for the mounting of two objects relative to each other.

Optionally in some examples, including in at least one preferred example, the third notch includes a first portion extending in a longitudinal direction of the first leg of the first bracket and a second portion extending from a transverse edge of the first bracket to the first portion of the third notch.

A technical benefit may include simplifying the design for a structure that provides substantial mounting support for mounting two objects relative to each other.

Optionally in some examples, including in at least one preferred example, the moving means comprises a quick-release bolt assembly comprising a bolt that extends through the first hole and the second hole, the bolt having a head at one end and a cam arrangement at an opposite end.

A technical benefit may include simplifying the design for a structure that provides substantial mounting support for mounting two objects relative to each other.

Optionally in some examples, including in at least one preferred example, the second pin is positionally fixed relative to the first leg of the second bracket.

A technical benefit may include simplifying the design for a structure that provides substantial mounting support for mounting two objects relative to each other.

Optionally in some examples, including in at least one preferred example, the first notch is disposed at a first end of the first leg of the first bracket.

A technical benefit may include simplifying the design for a structure that provides substantial mounting support for mounting two objects relative to each other.

Optionally in some examples, including in at least one preferred example, the second notch is disposed at a second end of the first leg of the first bracket.

A technical benefit may include simplifying the design for a structure that provides substantial mounting support for mounting two objects relative to each other.

Optionally in some examples, including in at least one preferred example, the first notch is disposed between and remote from first and second ends of the first leg of the first bracket.

A technical benefit may include simplifying the design for a structure that provides substantial mounting support for mounting two objects relative to each other, particularly where space is limited.

Optionally in some examples, including in at least one preferred example, the first notch includes a first portion extending in a longitudinal direction of the first leg of the first bracket and a second portion extending from a transverse edge of the first bracket to the first portion of the first notch.

A technical benefit may include simplifying the design for a structure that provides substantial mounting support for mounting two objects relative to each other, particularly where space is limited.

Optionally in some examples, including in at least one preferred example, the second notch is disposed between and remote from the first and second ends of the first leg of the first bracket.

A technical benefit may include simplifying the design for a structure that provides substantial mounting support for mounting two objects relative to each other, particularly where space is limited.

Optionally in some examples, including in at least one preferred example, the mounting device further comprises a mirror image first bracket comprising a first leg of the mirror image first bracket, the mirror image first leg of the first bracket being a mirror image of the first bracket and comprising a first notch and a second notch remote from the first notch, the first pin being receivable in the first notch of the mirror image first bracket and the second pin being receivable in the second notch of the mirror image first bracket.

A technical benefit may include providing additional structural support for the mounting of two objects relative to each other.

Optionally in some examples, including in at least one preferred example, the mounting device further comprises a mirror image second bracket, the mirror image second bracket being a mirror image of the second bracket and comprising a first leg of the mirror image second bracket, the locking arrangement being attached to the first leg of the mirror image second bracket.

A technical benefit may include providing additional structural support for the mounting of two objects relative to each other.

Optionally in some examples, including in at least one preferred example, the first leg of the second bracket is connected to the first leg of the mirror image second bracket by a web.

A technical benefit may include simplifying the design of and manner of attachment for mounting of two objects relative to each other.

Optionally in some examples, including in at least one preferred example, the elongated member of the locking arrangement is disposed the between the first leg of the second bracket and the first leg of the mirror image second bracket.

A technical benefit may include simplifying the design for a structure that provides substantial mounting support for mounting two objects relative to each other and accommodating space limitations.

Optionally in some examples, including in at least one preferred example, the at least one of the first leg of the second bracket and the first leg of the mirror image second bracket is disposed between first leg of the first bracket and the first leg of the mirror image first bracket.

A technical benefit may include simplifying the design for a structure that provides substantial mounting support for mounting two objects relative to each other and accommodating space limitations.

Optionally in some examples, including in at least one preferred example, both the first leg of the second bracket and the first leg of the mirror image second bracket are disposed between first leg of the first bracket and the first leg of the mirror image first bracket.

A technical benefit may include simplifying the design for a structure that provides substantial mounting support for mounting two objects relative to each other and accommodating space limitations.

Optionally in some examples, including in at least one preferred example, both the first leg of the first bracket and the first leg of the mirror image first bracket are disposed between first leg of the second bracket and the first leg of the mirror image second bracket.

A technical benefit may include simplifying the design for a structure that provides substantial mounting support for mounting two objects relative to each other and accommodating space limitations.

Optionally in some examples, including in at least one preferred example, the first leg of the first bracket is connected to the first leg of the mirror image first bracket by a web.

A technical benefit may include simplifying the design of and manner of attachment for mounting of two objects relative to each other.

Optionally in some examples, including in at least one preferred example, at least one of the first bracket and the second bracket comprises a second leg extending at an angle relative to the at least one of the first leg of the first bracket and the first leg of the second bracket.

A technical benefit may include simplifying the design for a structure that provides substantial mounting support for mounting two objects relative to each other and accommodating space limitations.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Examples are described in more detail below with reference to the appended drawings.

DETAILED DESCRIPTION

Figure 1:
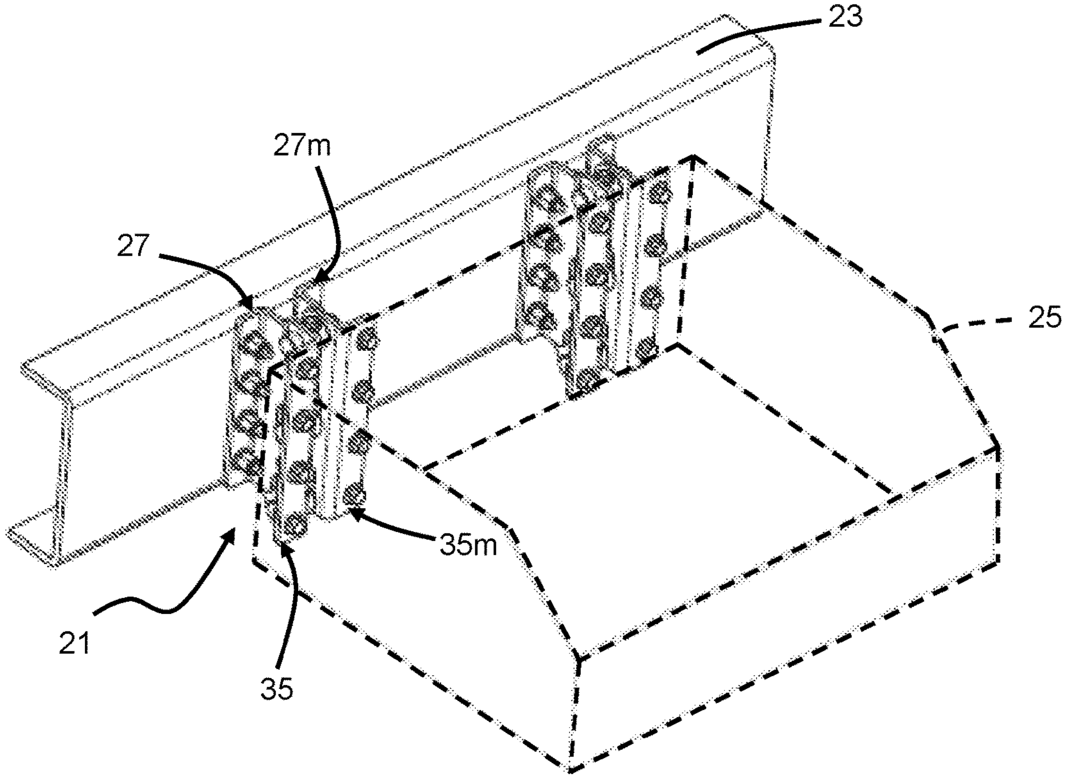
FIG. 1 is a perspective view of a mounting device according to an example.

A mounting device 21 according to an aspect of the present invention is shown in FIG. 1. The mounting device 21 is useful for mounting two objects to each other. For example, in FIG. 1, the mounting device 21 mounts a first object 23, such as a rail of a vehicle such as a truck, to a second object 25, such as a battery box. It will be appreciated, however, that the mounting device according to the present invention can be used to mount many different types of objects to each other.

Figure 2:
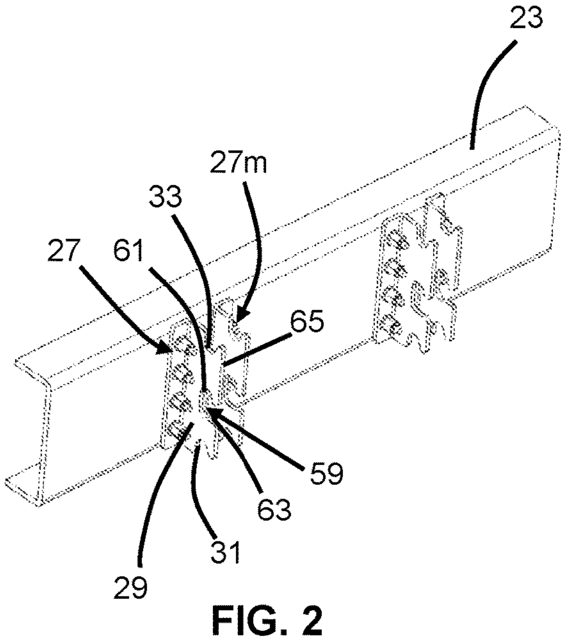
FIG. 2 is a perspective view of a first bracket portion of a mounting device according to an example.

The mounting device 21 includes a first bracket 27, seen in FIG. 2, comprising a first leg 29 of the first bracket. The first leg 29 of the first bracket 27 comprises a first notch 31 and a second notch 33 remote from the first notch. The first bracket 27 will ordinarily be attached to one of the two objects to be mounted to each other. In FIGS. 1 and 2, the first bracket 27 is attached to the first object 23, such as a rail of a vehicle such as a truck.

Figure 3:
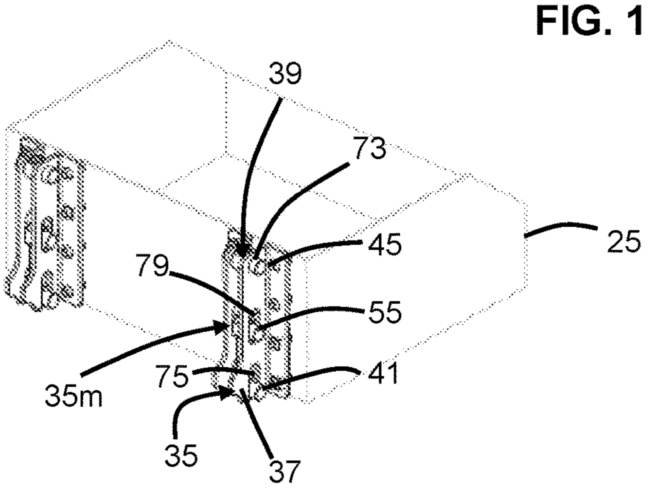
FIG. 3 is a perspective view of a second bracket portion of a mounting device according to an example.

The mounting device 21 also includes a second bracket 35. The second bracket 35 comprises a first leg 37 of the second bracket. The second bracket 35 will ordinarily be attached to the other one of the two objects to be mounted to each other. In FIGS. 1 and 3, the second bracket 27 is attached to the second object 25, such as a battery box for a truck.

The mounting device 21 also includes a locking arrangement 39 attached to the first leg 37 of the second bracket 35. The locking arrangement 39 comprises a first pin 41, an aspect of which is seen in more detail in FIG. 4, having a first hole 43 extending therethrough generally perpendicularly to a length dimension of the first pin, a second pin 45 having a second hole 47 extending therethrough generally perpendicularly to a length dimension of the second pin, an elongated member 49 extending through the first hole and the second hole, and means for moving the first pin and the second pin toward and away from each other. As seen for example in FIGS. 5A-9C, the first pin is receivable in the first notch in the first leg of the first bracket and the second pin is receivable in the second notch in the first leg of the first bracket. The first pin 41 is receivable in a notch 75 in the first leg 37 of the second bracket 35, and the second pin 45 is received or receivable in a hole 77 (or slot 377 as in FIGS. 8A-8C) in the first leg of the second bracket. In all aspects of the invention described herein, except where otherwise noted, the pins may be provided with enlarged portions 81 or other structures as shown in phantom in FIG. 11 to assist in retaining the pins relative to the first leg of the second bracket and, when the pins are in notches on the first leg of the first bracket, relative to the first leg of the first bracket.

Figure 4:
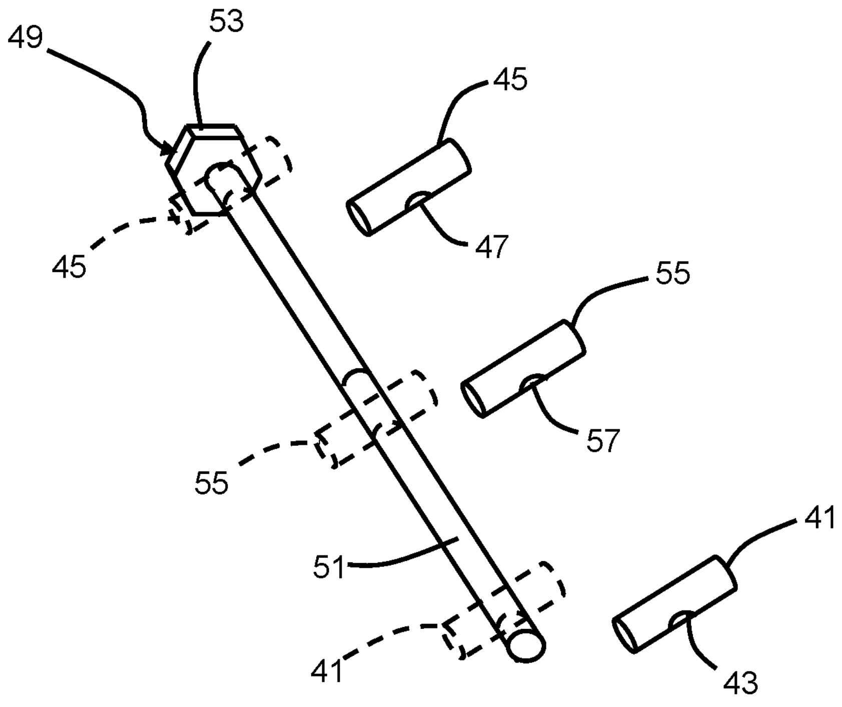
FIG. 4 is a perspective view of a locking arrangement of a mounting device according to an example.

The moving means shown in FIG. 4 comprises an elongated member 49 in the form of a drawbolt having a threaded end 51 and a headed end 53 at an opposite end of the drawbolt from the threaded end. The first hole 43 in the first pin 41 is a threaded hole in which (as seen in phantom) the threaded end 51 of the elongated member/drawbolt 49 is disposed. The elongated member/drawbolt 49 extends (as seen in phantom) through the second hole 47 of the second pin 45 so that the headed end 53 of the drawbolt is disposed on a side of the second pin opposite from the first pin 41. Upon rotating the elongated member/drawbolt 49 relative to the first pin 41 and the second pin 45, the second pin will be drawn toward or moved away from the first pin depending upon the direction of rotation of the elongated member/drawbolt.

In FIGS. 1, 4, and 5A-5C the locking arrangement 39 comprises a third pin 55 having a threaded third hole 57 in which (as seen in phantom in FIG. 4) the threaded end 51 of the elongated member/drawbolt 49 is disposed. The third pin 55 is disposed between the first pin 41 and the second pin 45 along the elongated member/drawbolt 49. The first leg 29 of the first bracket 27 comprises a third notch 59 between the first notch 31 and the second notch 33 in which the third pin 55 is receivable. The first leg 37 of the second bracket 35 comprises a slot 79 in which the third pin 55 is disposed. As seen, for example, the third notch 59 can include a first portion 61 extending in a longitudinal direction of the first leg 29 of the first bracket 27 and a second portion 63 extending from a transverse edge 65 of the first bracket to the first portion of the third notch. Upon rotating the elongated member/drawbolt 49 relative to the first pin 41, the second pin 45, and the third pin 55, the second pin and the third pin will be drawn toward or moved away from the first pin depending upon the direction of rotation of the elongated member/drawbolt. The third pin 55 and third notch 59 may be useful for additional security but may be omitted where desired or necessary.

Figure 16A:
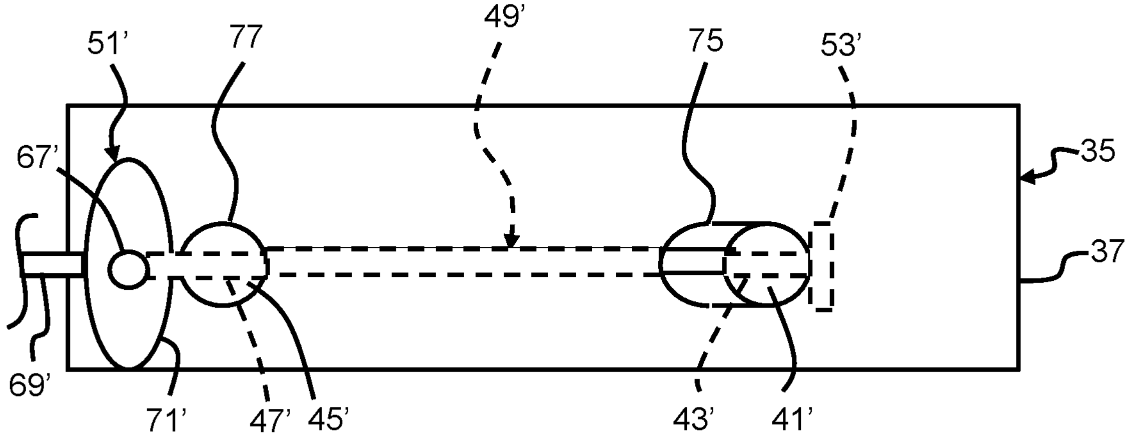
FIGS. 16A and 16B are side views of a locking arrangement of a mounting device according to another example showing the locking arrangement in an open position in FIG. 16A and showing the locking arrangement in a closed position in FIG. 16B.
Figure 16B:
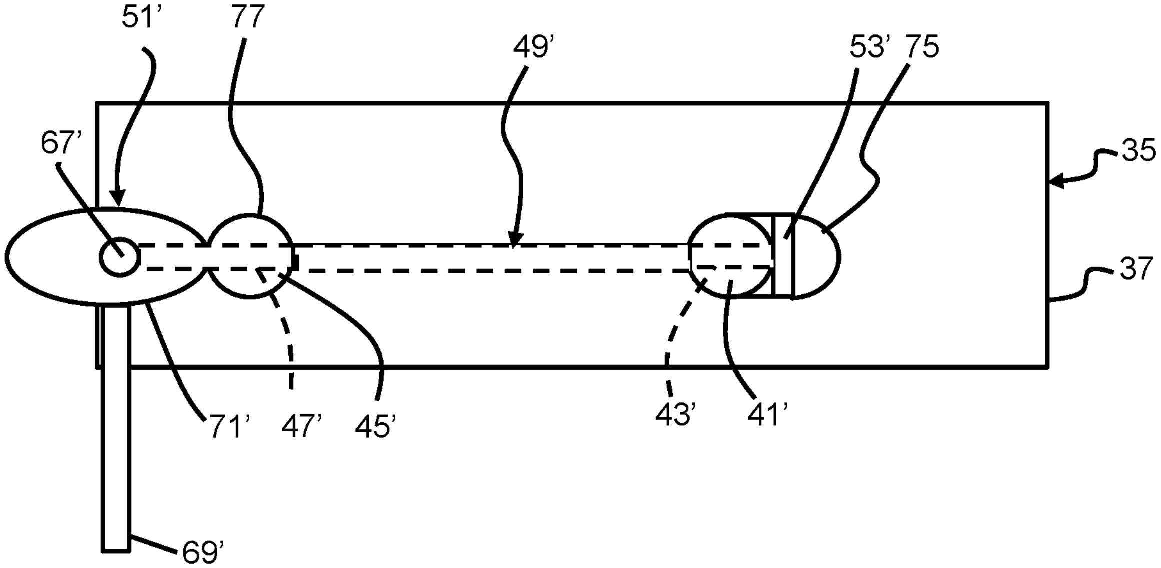

It will be appreciated that alternatives to a moving means comprising an elongated member/drawbolt arrangement can be provided. For example, as seen in FIGS. 16A-16B, the moving means may comprise a quick-release bolt assembly similar to the type typically used to secure bicycle wheels to forks comprising a bolt 49' that extends through the first hole 43' (which need not be threaded) in the first pin 41' and the second hole 47' in the second pin 45'. The bolt 49' has a head 53' (which may be in the form of a removable nut) at one end and a cam arrangement 51' rotatably mounted to an axle 67' at an opposite end. The cam arrangement 51' may include a lever 69' to rotate a cam 71' of the cam arrangement between for moving the first pin 41' and the second pin 45' to a first position shown in FIG. 16A in which they are distant from each other and a second position shown in FIG. 16B in which the first pin and the second pin are closer to each other. The moving means may be attached to the first leg 37 of the second bracket 35 with the first pin 41' disposed in a slot 75 or notch and the second pin 45' disposed in a hole 77 or slot.

Figure 17A:
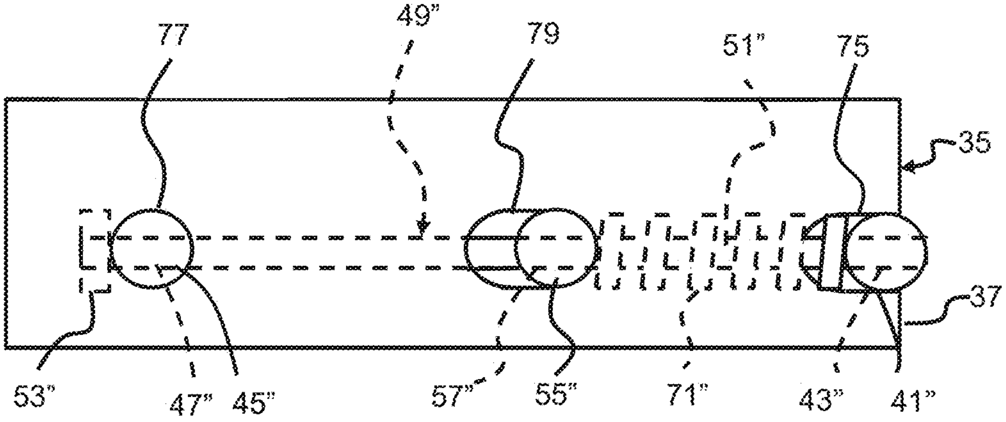
FIGS. 17A and 17B are side views of a locking arrangement of a mounting device according to another example showing the locking arrangement in an open position in FIG. 17A and showing the locking arrangement in a closed position in FIG. 17B.
Figure 17B:
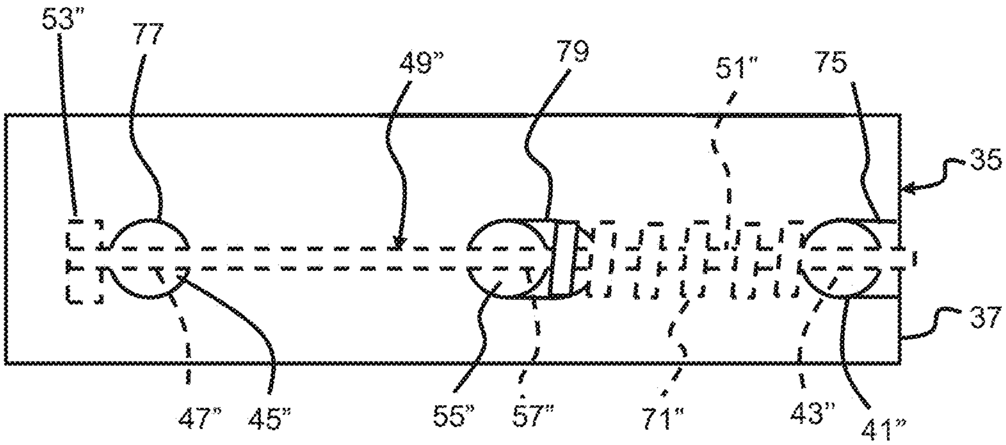

In another form of moving means seen in FIGS. 17A-17B, an unthreaded portion of a bolt 49" may extend through an unthreaded third hole 57" in a third pin 55" which is slidably mounted in a slot 79 in the first leg 37 of the second bracket 35. A threaded portion 51" of the bolt 49" opposite a headed end 53" extends through a threaded first hole 43" in the first pin 41" which is slidably mounted in a slot 75 in the first leg 37 of the second bracket 35 and the second hole 47" in the second pin 45" which is mounted in a hole 77 (or slot) in the first leg of the second bracket. A spring 71" is attached around the bolt 49" and in contact with the first pin 41" and the third pin 55". Upon turning the bolt 49" to draw the first pin 41" toward the second pin 45", the spring 71" is compressed to also draw the third pin 55" toward the first pin. Instead of a spring, a rigid member might, instead, be provided between the first pin 41" and the third pin 55".

Figure 18A:
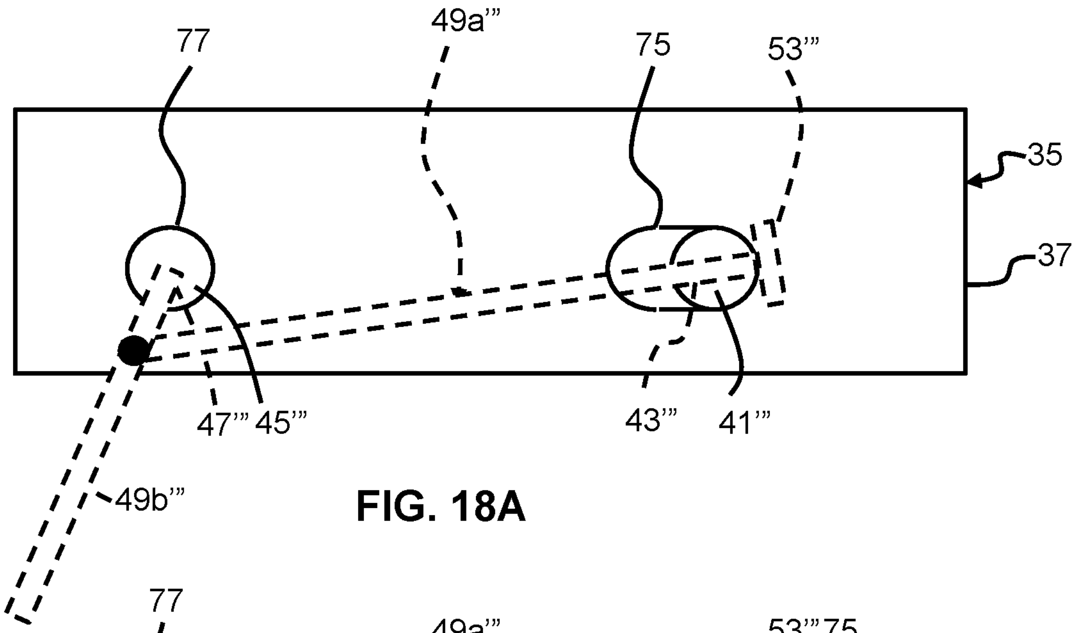
FIGS. 18A and 18B are side views of a locking arrangement of a mounting device according to another example showing the locking arrangement in an open position in FIG. 18A and showing the locking arrangement in a closed position in FIG. 18B.
Figure 18B:
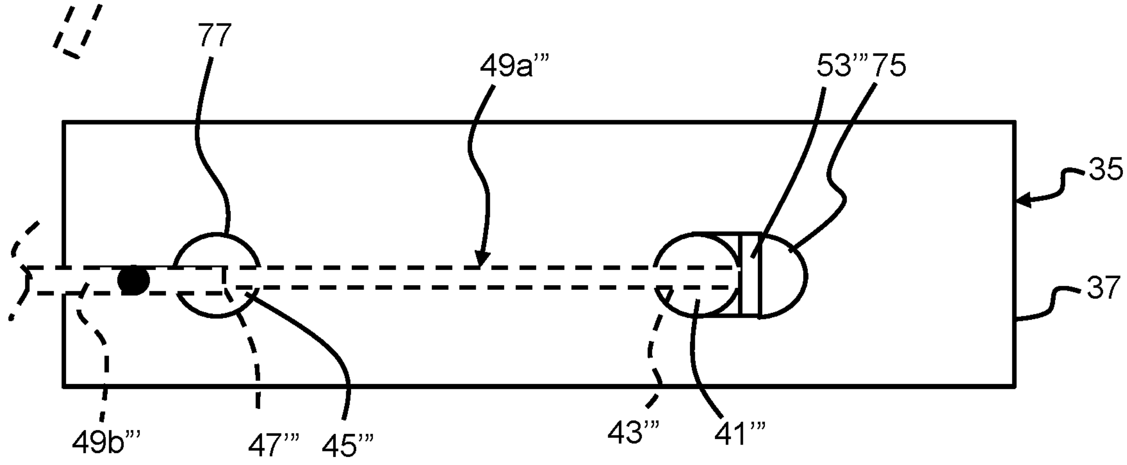

In yet another form of moving means seen in FIGS. 18A-18B, a link 49*a*''' is attached to the first pin 41''', such as by extending through a hole 43' in the first pin and having a headed end 53' on an end of the link, on an opposite side of the first pin from the second pin 45'''. The first pin 41" is slidably mounted in a slot 75 in the first leg 37 of the second bracket 35. The link 49*a*" is pivotably attached to a lever 49*b*''' that can be attached to the second pin 45''', which can be rotatably mounted in a hole 77 in the first leg 37 of the second bracket 35. Upon moving the lever 49*b*''' from an open position as shown in FIG. 18A to a closed position as shown in FIG. 18B, the first pin 41''' is moved in the slot 75 toward the second pin 45'''.

Figure 5A:
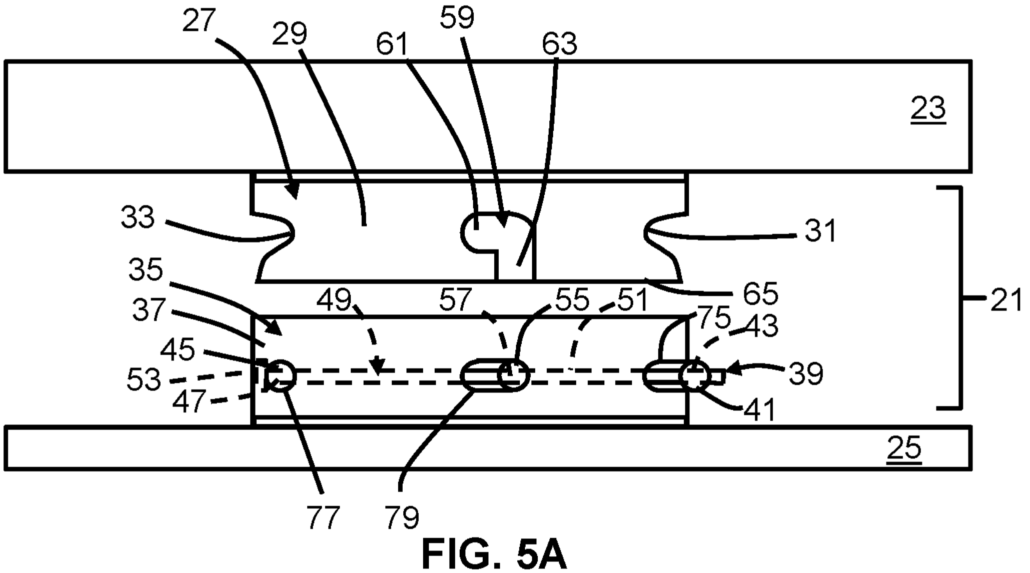
FIGS. 5A-5C are side views of a mounting device according to an example showing first and second bracket portions of the mounting device separated in FIG. 5A, at the beginning of a mounting operation in FIG. 5B, and fully mounted in FIG. 5C.

Operation of the mounting device is substantially the same for all aspects of the present invention, except where otherwise indicated, and shall be described with reference to FIGS. 5A-5C, which shows a mounting device 21 of the general type shown in FIG. 1. The first bracket 27 is attached to a first object 23 by any suitable technique, such as bolting or welding, and the second bracket 35 is attached to a second object 27, also by any suitable technique. As seen in FIG. 5A, prior to attaching the first bracket 27 to the second bracket 35 to mount the first object 23 relative to the second object 25, the locking arrangement 39 is configured so that the first pin 41 and the third pin 55 are disposed at a first position in which they are distant from the second pin 45.

The second pin 45 of the second bracket 35 is then placed in the second notch 33 in the first bracket 27. The second bracket 35 is the moved, such as by being pivoted about an axis defined by the second pin 45, relative to the first bracket so that, as seen in FIG. 5B, the first pin 41 is at a first end of the first notch 31 in the first bracket and the third pin 55 is moved through the second portion 63 of the third notch 59 to at a first end of the first portion 61 of the third notch. The first bracket 27 and the second bracket 35 are in an unsecured condition in FIG. 5B.

Figure 5B:
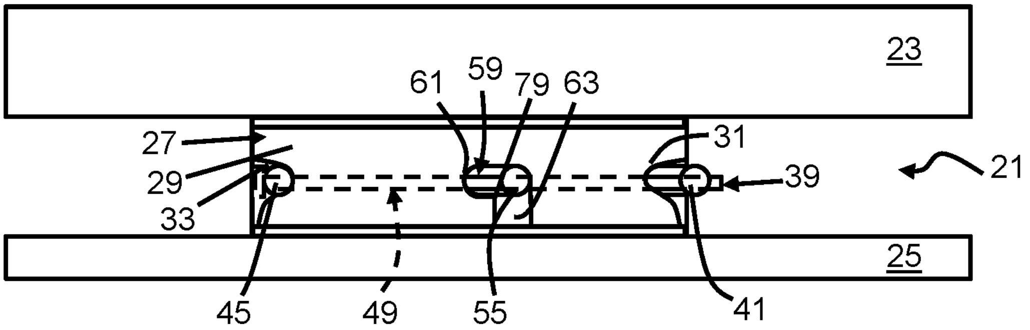
Figure 5C:
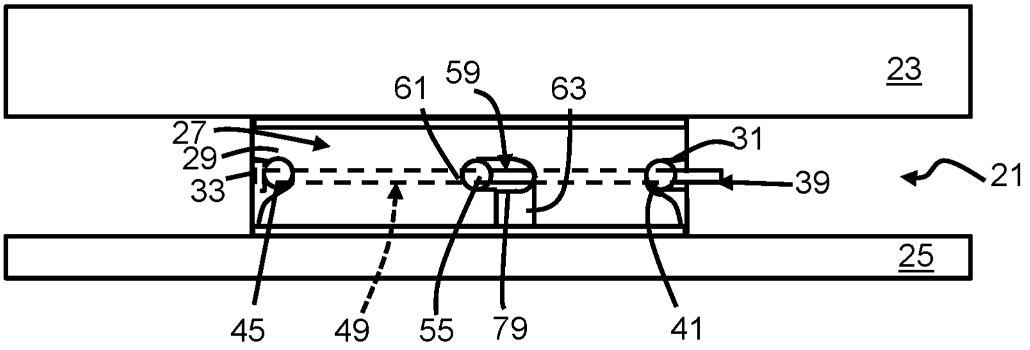

As seen in FIG. 5C, the moving means moves the first pin 41 to at a second end of the first notch 31 in the first bracket and moves the third pin 55 to a second end of the first portion 61 of the third notch 59, such as by rotation of an elongated member/drawbolt 49. The first bracket 27 and the second bracket 35 are in a secured condition in FIG. 5C, and the first object 23 is mounted to the second object 25.

The mounting device according to the present invention may have a variety of configurations and features in addition to or different from the configurations and features of the mounting device 21 shown in FIGS. 5A-5C. For example, as seen in aspects shown in FIGS. 5A-7C and 9A-9C, the second pin 45 may be positionally fixed relative to the first leg 37 of the second bracket 35, such as by being disposed in the hole 73 in the first leg of the second member. Ordinarily, but not necessarily, the second pin 45 may be rotatably mounted in the hole 73 in the first leg of the second bracket. Alternatively, as seen in FIGS. 8A-8C, the second pin 345' may be slidably disposed in an elongated hole 373' in the first leg 337' of the second bracket 35'.

In certain aspects, such as in aspects seen in FIGS. 5A-5C, FIGS. 6A-6C, and 7A-7C, the first notch is disposed at a first end of the first leg of the first bracket. The first notch may, however, be disposed between and remote from first and second ends of the first leg of the first bracket. The first notch may, for example, include a first portion extending in a longitudinal direction of the first leg of the first bracket and a second portion extending from a transverse edge of the first bracket to the first portion of the first notch as seen in aspects of the invention seen in FIGS. 8A-8C and 9A-9C. Similarly, the second notch may be disposed at a second end of the first leg of the first bracket as seen in aspects of the invention shown in FIGS. 5A-5C and 6A-6C or, alternatively, disposed between and remote from the first and second ends of the first leg of the first bracket as shown in FIGS. 7A-7C, 8A-8C, and 9A-9C, wherein the second notch includes a first portion extending in a longitudinal direction of the first leg of the first bracket and a second portion extending from a transverse edge of the first bracket to the first portion of the first notch.

As seen in FIGS. 1 and 2, the mounting device may comprise, in addition to the first bracket, a mirror image first bracket comprising a first leg of the mirror image first bracket. The mirror image first leg of the first bracket will ordinarily be a mirror image of the first bracket and may comprise a first notch and a second notch remote from the first notch, the first pin being receivable in the first notch of the mirror image first bracket and the second pin being receivable in the second notch of the mirror image first bracket. Similarly, as seen in FIGS. 1 and 3, the mounting device may comprise, in addition to the second bracket, a mirror image second bracket, the mirror image second bracket being a mirror image of the second bracket and comprising a first leg of the mirror image second bracket, the locking arrangement being attached to the first leg of the mirror image second bracket. Further, the first leg of the first bracket may be connected to the first leg of the mirror image first bracket by a web, and/or the first leg of the second bracket may be connected to the first leg of the mirror image second bracket by a web. Where first and second brackets and first and/or second mirror image brackets are provided, the elongated member of the locking arrangement will ordinarily be disposed the between the first leg of the first and the second bracket and the first leg of the mirror image first and/or second bracket. Where first and second brackets and first and second mirror image brackets are provided, at least one of the first leg of the second bracket and the first leg of the mirror image second bracket is disposed between first leg of the first bracket and the first leg of the mirror image first bracket, or both the first leg of the second bracket and the first leg if the mirror image second bracket are disposed between first leg of the first bracket and the first leg of the mirror image first bracket, or both the first leg of the first bracket and the first leg of the mirror image first bracket are disposed between first leg of the second bracket and the first leg of the mirror image second bracket.

The first bracket and/or the second bracket may take a variety of shapes. In addition to shapes wherein the first leg of the first bracket is connected to the first leg of the mirror image first bracket by a web, and/or the first leg of the second bracket is connected to the first leg of the mirror image second bracket by a web, i.e., substantially C- or U-shaped structures, the first bracket and/or the second bracket may be configured as flat plates, or angled structures. For example, the first bracket may comprise a second leg of the first bracket joined to the first leg of the first bracket at a corner to form an angle, such as a 90° angle, and/or the second bracket may comprise a second leg of the second bracket joined to the first leg of the second bracket at a corner to form an angle, such as a 90° angle.

FIGS. 5A-5C show an aspect of the mounting device 21 for mounting a first object 23 to a second object 25. The mounting device 21 includes a first bracket 27 having a first leg 29 of the first bracket with a first notch 31, a second notch 33, and a third notch 59. The mounting device 21 further includes a second bracket 35 having a first leg 37 of the second bracket. The mounting device 21 also includes a locking arrangement 39 attached to the first leg 37 of the second bracket 35. The locking arrangement 39 comprises a first pin 41 having a first hole 43 extending therethrough generally perpendicularly to a length dimension of the first pin, a second pin 45 having a second hole 47 extending therethrough generally perpendicularly to a length dimension of the second pin, and a third pin 55 having a third hole 57 extending therethrough generally perpendicularly to a length dimension of the third pin, and an elongated member 49 extending through the first hole, the second hole, and the third hole. Means for moving the first pin 41 and the third pin 55 toward and away from the second pin 45 can include any suitable means for doing so, such as a drawbolt having a threaded end 51 and a headed end 53 at an opposite end of the drawbolt from the threaded end. The first hole 43 in the first pin 41 and the third hole 57 in the third pin 55 are threaded holes in which (as seen in phantom) the threaded end 51 of the elongated member/drawbolt 49 is disposed. The elongated member/drawbolt 49 extends (as seen in phantom) through the second hole 47 of the second pin 45 so that the headed end 53 of the drawbolt is disposed on a side of the second pin opposite from the first pin 41. Upon rotating the elongated member/drawbolt 49 relative to the first pin 41, the second pin 45, and the third pin 55, the second pin and the third pin will be drawn toward or moved away from the first pin depending upon the direction of rotation of the elongated member/drawbolt.

As seen in FIG. 5A, prior to attaching the first bracket 27 to the second bracket 35 to mount the first object 23 relative to the second object 25, the locking arrangement 39 is configured so that the first pin 41 and the third pin 55 are disposed at a first position in which they are distant from the second pin 45. The second pin 45 of the second bracket 35 is then placed in the second notch 33 in the first bracket 27. The second bracket 35 is the moved, such as by being pivoted about an axis defined by the second pin 45, relative to the first bracket so that, as seen in FIG. 5B, the first pin 41 is at a first end of the first notch 31 in the first bracket and the third pin 55 is moved through the second portion 63 of the third notch 59 to at a first end of the first portion 61 of the third notch. The first bracket 27 and the second bracket 35 are in an unsecured condition in FIG. 5B. As seen in FIG. 5C, the moving means moves the first pin 41 to at a second end of the first notch 31 in the first bracket and moves the third pin 55 to a second end of the first portion 61 of the third notch 59, such as by rotation of an elongated member/drawbolt 49. The first bracket 27 and the second bracket 35 are in a secured condition in FIG. 5C, and the first object 23 is mounted to the second object 25.

Figure 6A:
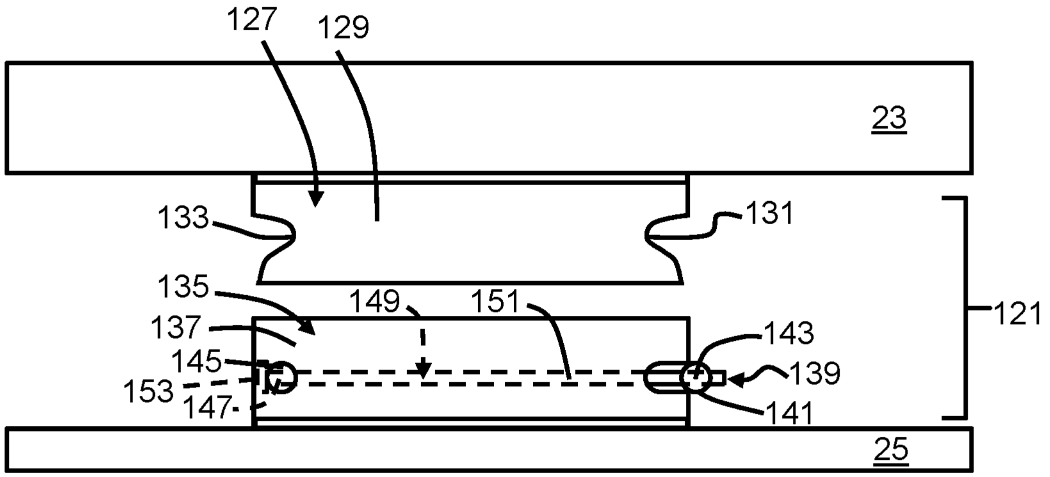
FIGS. 6A-6C are side views of a mounting device according to another example showing first and second bracket portions of the mounting device separated in FIG. 6A, at the beginning of a mounting operation in FIG. 6B, and fully mounted in FIG. 6C.
Figure 6B:
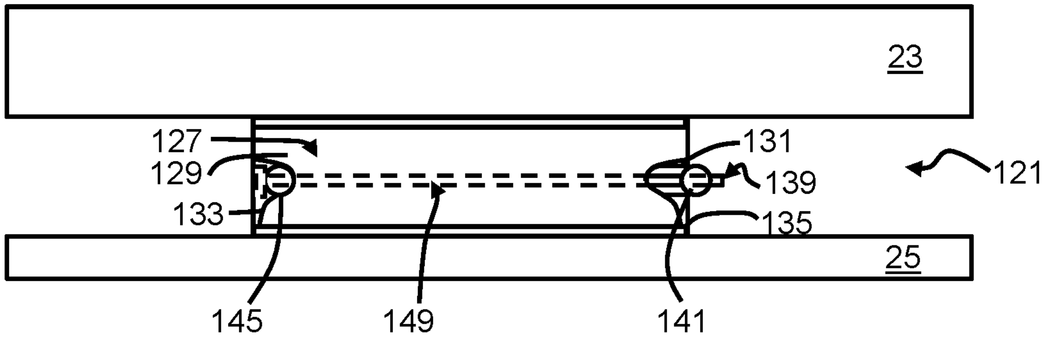
Figure 6C:
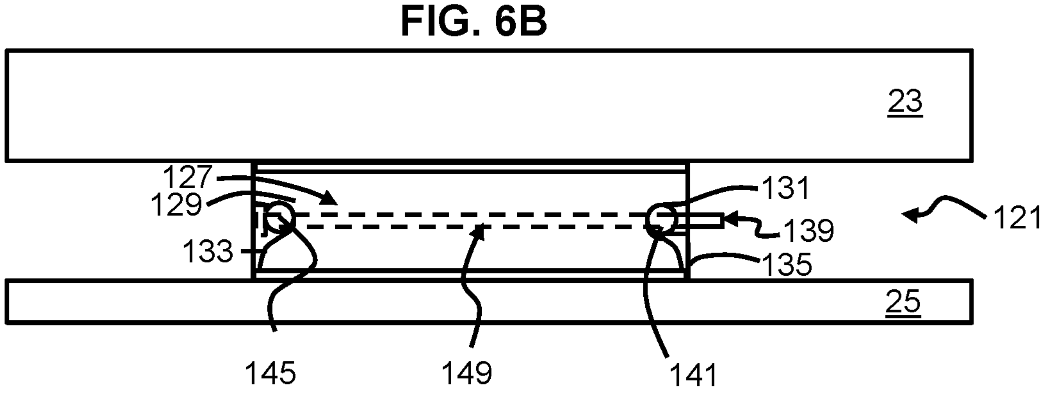

The mounting device 121 shown in FIGS. 6A-6C is similar in structure and operation to the mounting device 21 shown in FIGS. 5A-5C except that the third pin and the third notch are omitted. The mounting device 121 includes a first bracket 127 having a first leg 129 of the first bracket with a first notch 131 and a second notch 133. The mounting device 121 further includes a second bracket 135 having a first leg 137 of the second bracket. The mounting device 121 also includes a locking arrangement 139 attached to the first leg 137 of the second bracket 135. The locking arrangement 139 comprises a first pin 141 having a first hole 143 extending therethrough generally perpendicularly to a length dimension of the first pin, and a second pin 145 having a second hole 147 extending therethrough generally perpendicularly to a length dimension of the second pin, and an elongated member 149 extending through the first hole, the second hole, and the third hole. Means for moving the first pin 141 toward and away from the second pin 145 can include any suitable means for doing so, such as a drawbolt having a threaded end 151 and a headed end 153 at an opposite end of the drawbolt from the threaded end. The first hole 143 in the first pin 141 can be a threaded hole in which (as seen in phantom) the threaded end 151 of the elongated member/drawbolt 149 is disposed. The elongated member/drawbolt 149 extends (as seen in phantom) through the second hole 147 of the second pin 145 so that the headed end 153 of the drawbolt is disposed on a side of the second pin opposite from the first pin 141. Upon rotating the elongated member/drawbolt 149 relative to the first pin 141 and the second pin 145, the second pin will be drawn toward or moved away from the first pin depending upon the direction of rotation of the elongated member/drawbolt.

Figure 7A:
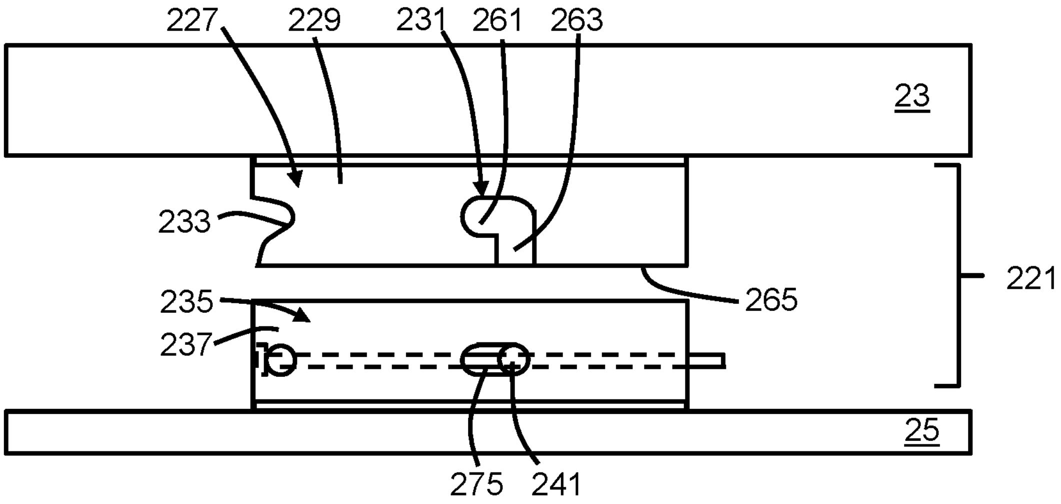
FIGS. 7A-7C are side views of a mounting device according to yet another example showing first and second bracket portions of the mounting device separated in FIG. 7A, at the beginning of a mounting operation in FIG. 7B, and fully mounted in FIG. 7C.
Figure 7B:
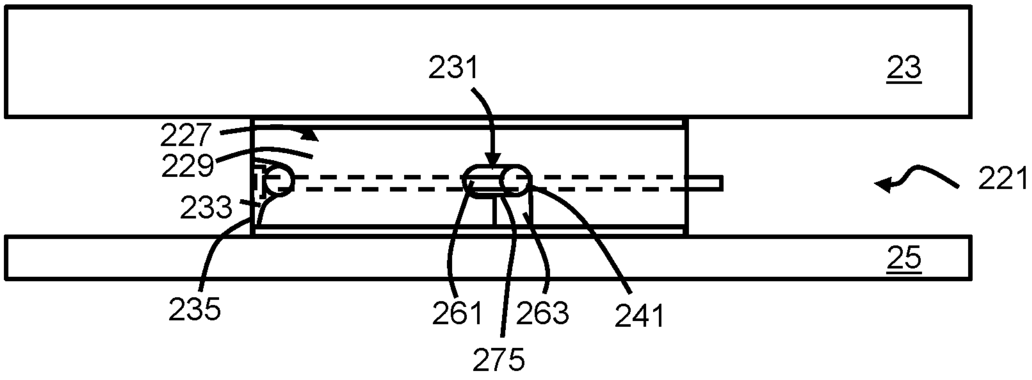
Figure 7C:
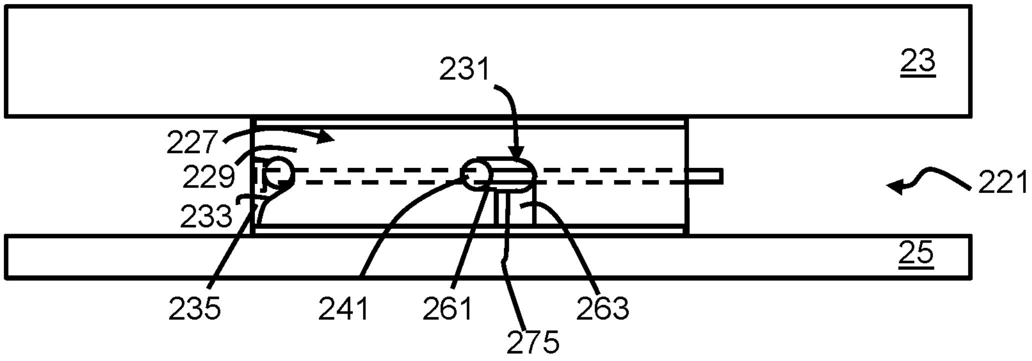
Figure 8A:
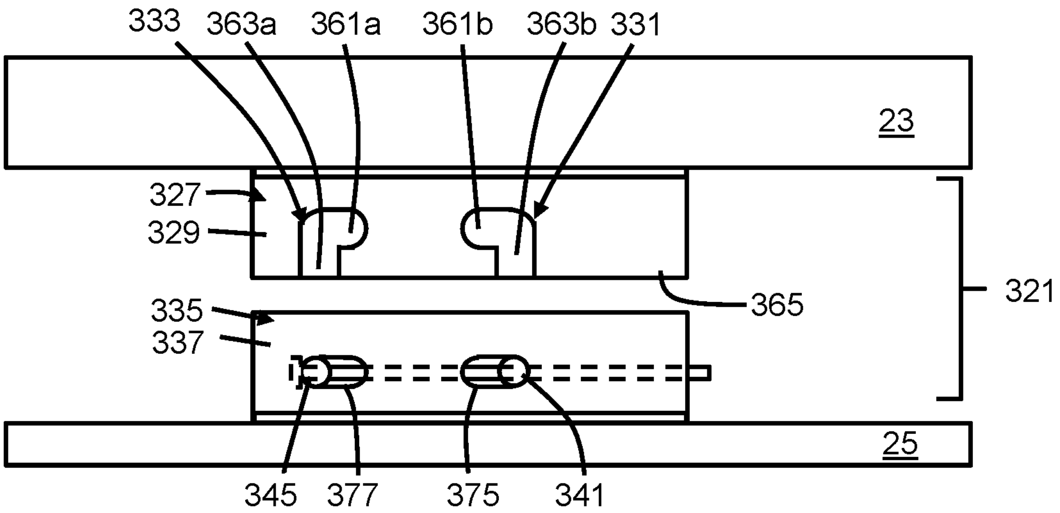
FIGS. 8A-8C are side views of a mounting device according to yet another example showing first and second bracket portions of the mounting device separated in FIG. 8A, at the beginning of a mounting operation in FIG. 8B, and fully mounted in FIG. 8C.
Figure 8B:
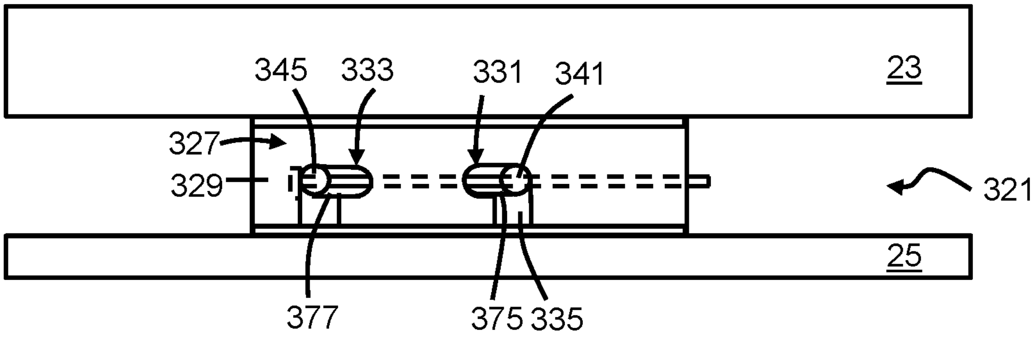
Figure 8C:
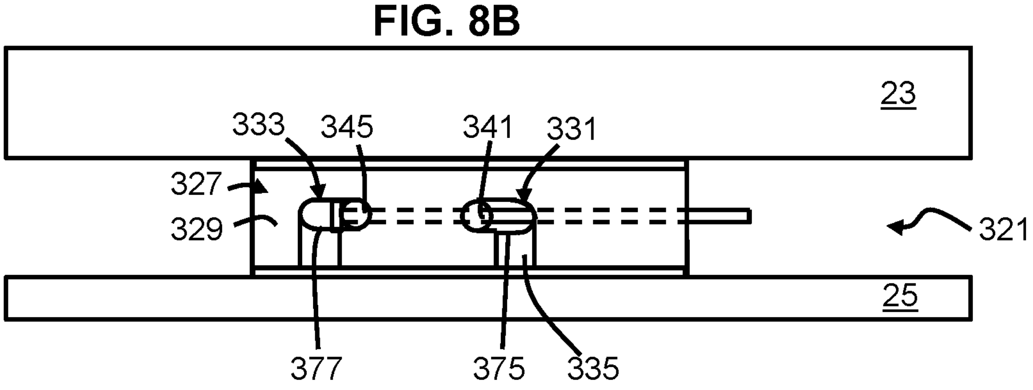

The mounting device 221 shown in FIGS. 7A-7C is similar in structure and operation to the mounting device 21 shown in FIGS. 5A-5C except that, instead of the first notch on the first leg of the first bracket being disposed at an end of the first leg of the first bracket, the first notch 231 can include a first portion 261 extending in a longitudinal direction of the first leg 229 of the first bracket 227 and a second portion 263 extending from a transverse edge 265 of the first bracket to the first portion of the first notch. The second notch 233 on the first leg 229 of the first bracket 227 is disposed at an end of the first leg of the first bracket. The first pin 241 is slidably disposed in an elongated slot 275 in the first leg 237 of the second bracket 235. As in FIGS. 6A-6C, the third pin and the third notch are shown as omitted, however, they could be included if desired or necessary.

The mounting device 321 shown in FIGS. 8A-8C similar in structure and operation to the mounting device 221 shown in FIGS. 7A-7C except that, instead of the second notch on the first leg of the first bracket being disposed at an end of the first leg of the first bracket, the second notch 333 can include a first portion 361*a* extending in a longitudinal direction of the first leg 329 of the first bracket 327 and a second portion 363*a* extending from a transverse edge 365 of the first bracket to the first portion of the second notch. Also, instead of the second pin 345 being positionally fixed relative to the first leg of the second bracket by being disposed in a hole as in, for example, FIGS. 5A-5C, the second pin is disposed in a longitudinally extending slot 377 in the first leg 337 of the second bracket 335. As in FIGS. 7A-7C, the first notch 331 can include a first portion 361*b* extending in a longitudinal direction of the first leg 329 of the first bracket 327 and a second portion 363*b* extending from the transverse edge 365 of the first bracket to the first portion of the first notch. The first pin 341 is slidably disposed in an elongated slot 375 in the first leg 337 of the second bracket 335. As in FIGS. 6A-6C, the third pin and the third notch are shown as omitted, however, they could be included if desired or necessary.

Figure 9A:
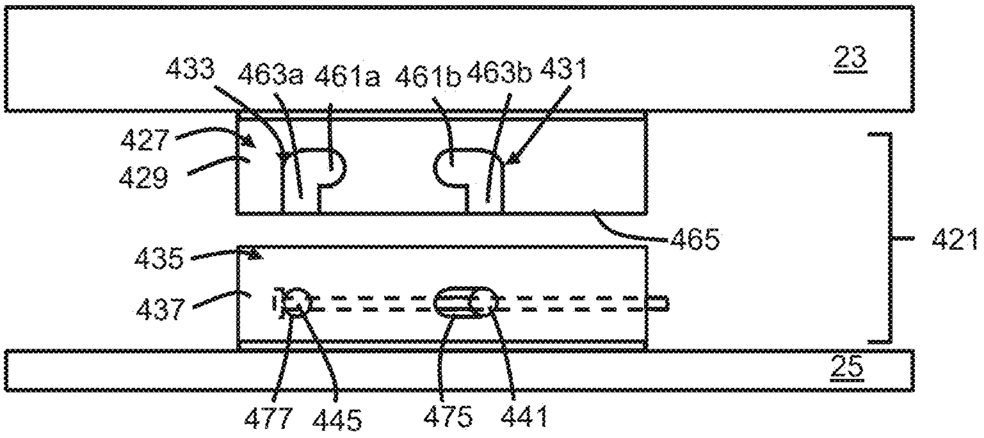
FIGS. 9A-9C are side views of a mounting device according to yet another example showing first and second bracket portions of the mounting device separated in FIG. 9A, at the beginning of a mounting operation in FIG. 9B, and fully mounted in FIG. 9C.
Figure 9B:
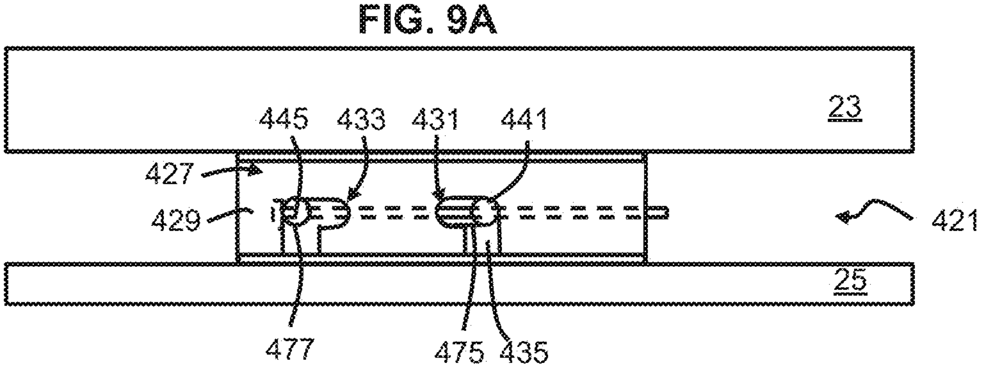
Figure 9C:
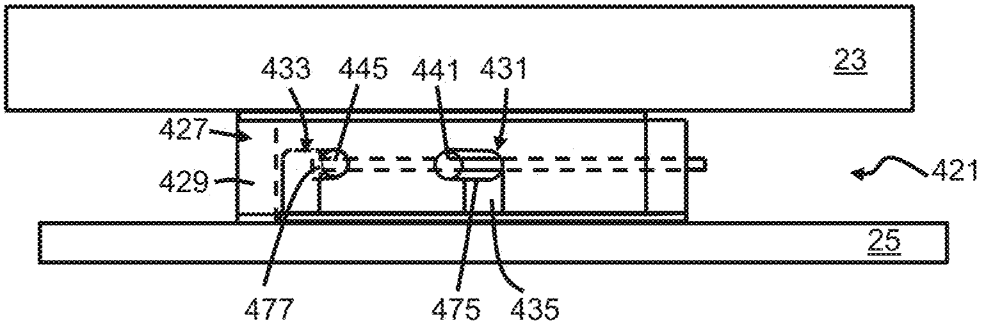

The mounting device 421 shown in FIGS. 9A-9C is similar in structure and operation to the mounting device 321 shown in FIGS. 8A-8C except that, instead of the second pin being disposed in a longitudinally extending slot in the first leg of the second bracket, the second pin 445 is positionally fixed relative to the first leg 437 of the second bracket 435 by being disposed in a hole 477. As in FIGS. 8A-8C, the second notch 433 can include a first portion 461*a* extending in a longitudinal direction of the first leg 429 of the first bracket 427 and a second portion 463*a* extending from a transverse edge 465 of the first bracket to the first portion of the second notch. As in FIGS. 8A-8C, the first notch 431 can include a first portion 461*b* extending in a longitudinal direction of the first leg 429 of the first bracket 427 and a second portion 463*b* extending from the transverse edge 465 of the first bracket to the first portion of the first notch. The first pin 441 is slidably disposed in an elongated slot 475 in the first leg 437 of the second bracket 435. As in FIGS. 6A-6C, the third pin and the third notch are shown as omitted, however, they could be included if desired or necessary. It will be seen from comparison of FIGS. 9B and 9C that, upon drawing the first pin 441 and the second pin 445 toward each other, the first bracket 427 and the second bracket 435 will be longitudinally displaced relative to each other.

Figure 10:
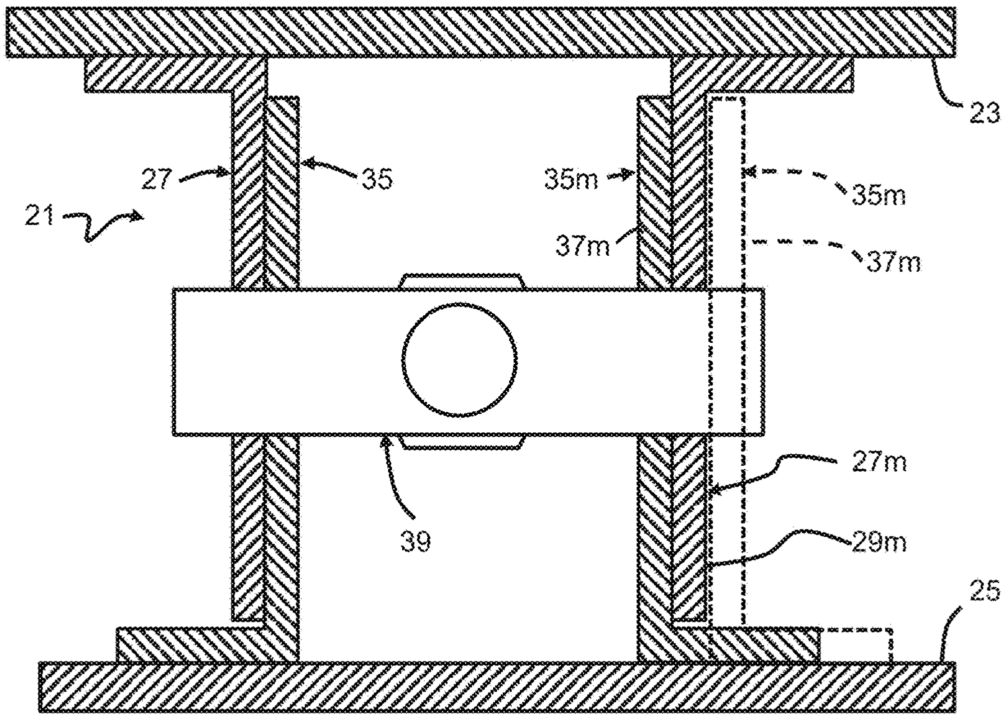
FIG. 10 is a cross-sectional view of a mounting device according to an example.

FIG. 10 is a cross-section of a mounting device 21 of the general type shown in FIGS. 1 and 5A-5C for mounting a first object 23 to a second object 25. The mounting device 21 includes a first bracket 27, a second bracket 35, and a locking arrangement 39. In addition, the mounting device 21 includes a mirror image first bracket 27*m* comprising a first leg 29*m* of the mirror image first bracket, the mirror image first leg of the first bracket being a mirror image of the first bracket 27 and comprising a first notch (not shown) and a second notch (not shown) remote from the first notch. A first pin as in the aspect of the invention shown in FIGS. 5A-5C is receivable in the first notch of the mirror image first bracket 27*m*, a second pin is receivable in the second notch of the mirror image first bracket, and a third pin (if provided) is receivable in a third notch (if provided) of the mirror image first bracket. The mounting device 21 further comprises a mirror image second bracket 35*m*, the mirror image second bracket being a mirror image of the second bracket 35 and comprising a first leg 37*m* of the mirror image second bracket, the locking arrangement 39 being attached to the first leg of the mirror image second bracket.

FIG. 10 shows the second bracket 35 and the mirror image second bracket 35*m* disposed between the first bracket 27 and the mirror image first bracket 27*m*. However, as shown in phantom, if desired or necessary, the first leg 37*m* of the mirror image second bracket 35*m* (or the first leg 37 of the second bracket 35) may be disposed outside the space defined by the first leg 29 of the first bracket 27 and the first leg 29*m* of the mirror image first bracket 27*m*. It will be appreciated that, where first and second brackets and first and second mirror image brackets are provided, one or both of the first leg of the second bracket and the first leg of the mirror image second bracket may be disposed between first leg of the first bracket and the first leg of the mirror image first bracket, or one or both of the first leg of the first bracket and the first leg of the mirror image first bracket are disposed between first leg of the second bracket and the first leg of the mirror image second bracket.

Figure 11:
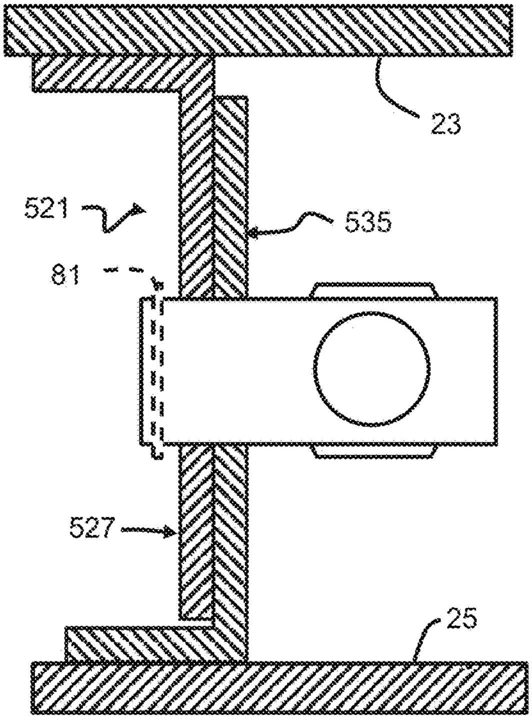
FIG. 11 is a cross-sectional view of a mounting device according to another example.

FIG. 11 is a cross-section of a mounting device 521 for mounting a first object 23 to a second object 25. The mounting device 521 includes a first bracket 527 and a second bracket 535. Unlike the mounting device shown in FIG. 10, the mounting device 521 does not include a mirror image first bracket or a mirror image second bracket. The pins may be provided with enlarged portions 81 or other structures as shown in phantom in FIG. 11 to assist in retaining the pins relative to the first leg of the second bracket and, when the pins are disposed in notches on the first leg of the first bracket, relative to the first leg of the first bracket.

Figure 12:
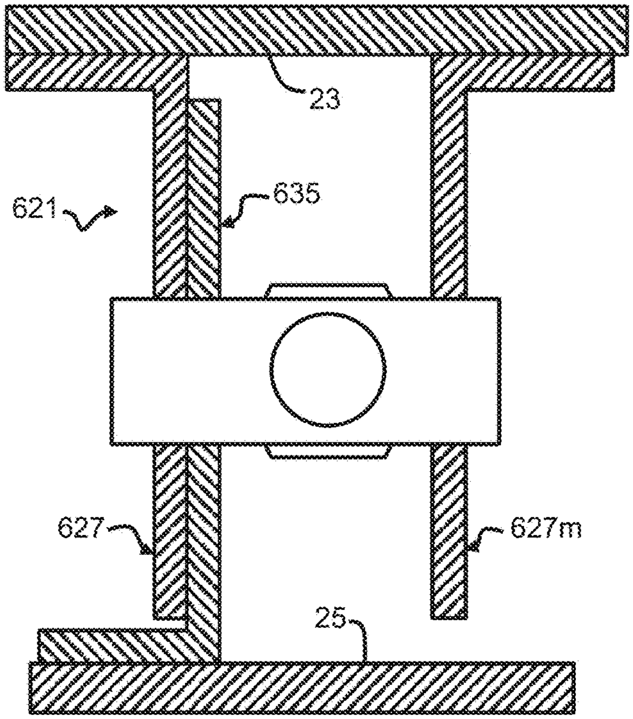
FIG. 12 is a cross-sectional view of a mounting device according to yet another example.

FIG. 12 is a cross-section of a mounting device 621 for mounting a first object 23 to a second object 25. The mounting device 621 includes a first bracket 627 and a second bracket 635. Unlike the mounting device shown in FIG. 10, the mounting device 621 does not include a mirror image second bracket but does include a mirror image first bracket 627*m*.

Figure 13:
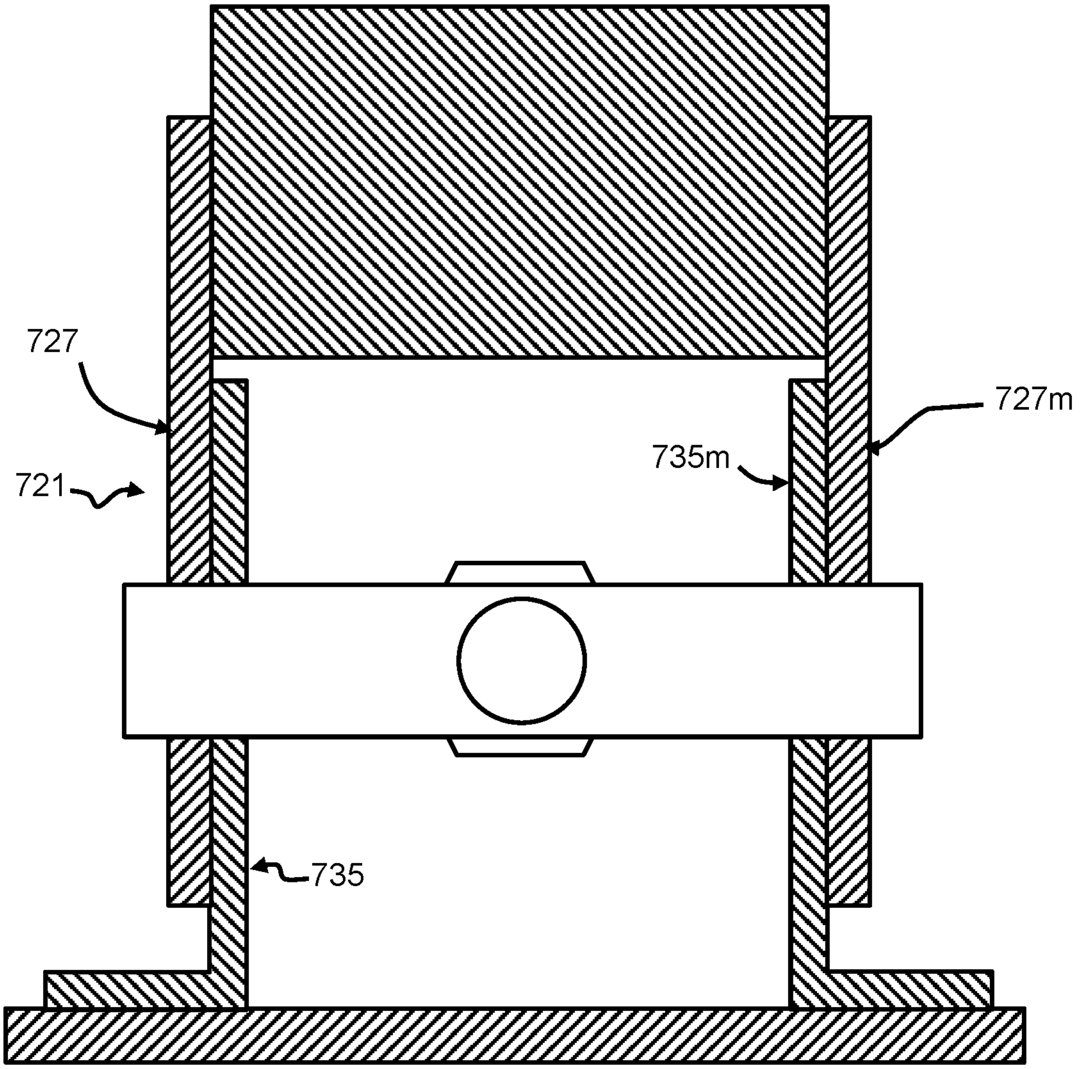
FIG. 13 is a cross-sectional view of a mounting device according to yet another example.

The mounting devices 21, 521, and 621 have first and second brackets that are in the form of angled members where the first bracket comprises a second leg of the first bracket joined to the first leg of the first bracket at a corner to form an angle, such as a 90° angle, and the second bracket comprises a second leg of the second bracket joined to the first leg of the second bracket at a corner to form an angle, such as a 90° angle. FIG. 13 is a cross-section of a mounting device 721 for mounting a first object 23 to a second object 25 wherein the first bracket 727 and the second bracket 735 are configured as flat plates. A mirror image first bracket 727*m* and a mirror image second bracket 735*m* are also shown, but may be omitted if desired or necessary.

Figure 14:
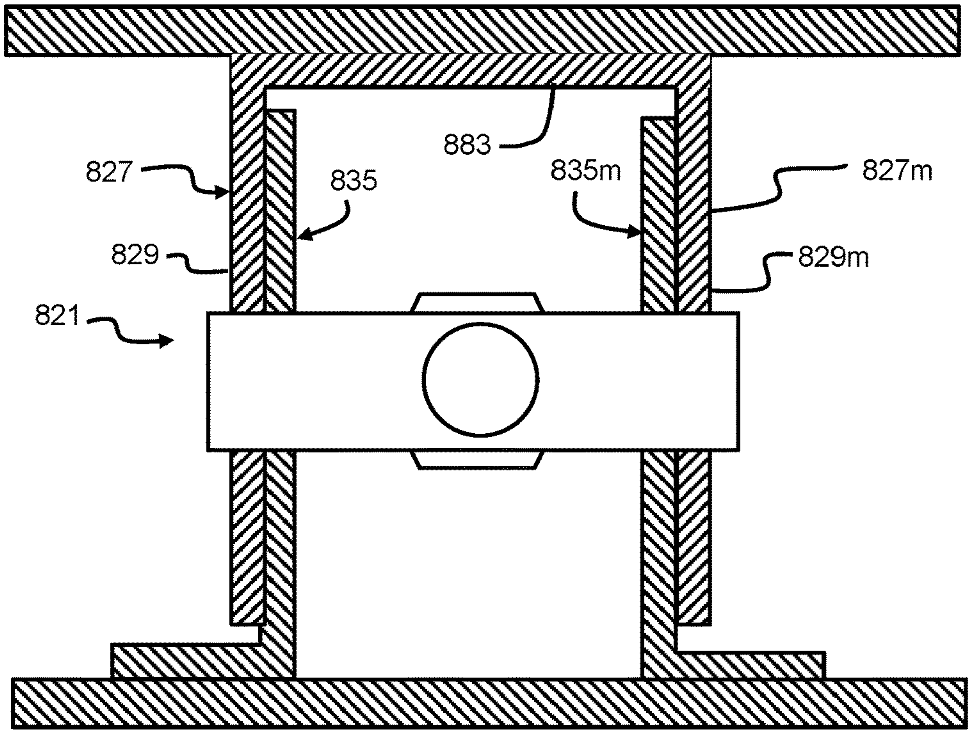
FIG. 14 is a cross-sectional view of a mounting device according to yet another example.

FIG. 14 is a cross-section of a mounting device 821 for mounting a first object 23 to a second object 25 wherein a first leg 829 of a first bracket 827 is connected to a first leg 829*m* of a mirror image first bracket 827*m* by a web 883 to form a substantially C- or U-shaped structure. A second bracket 835 and, if desired or necessary, a mirror image second bracket 835*m* are also provided. They may also, if desired or necessary, be connected by a web.

Figure 15:
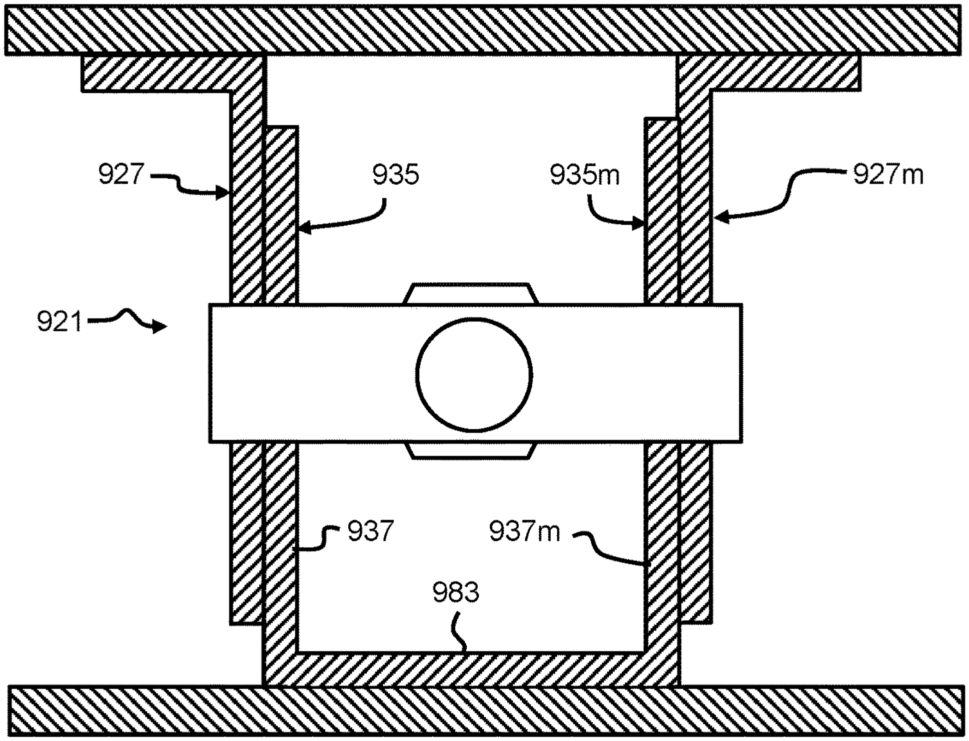
FIG. 15 is a cross-sectional view of a mounting device according to yet another example.

FIG. 15 is a cross-section of a mounting device 921 for mounting a first object 23 to a second object 25 wherein a first leg 937 of a second bracket 935 is connected to a first leg 937*m* of a mirror image first bracket 935*m* by a web 983 to form a substantially C- or U-shaped structure. A first bracket 927 and, if desired or necessary, a mirror image first bracket 927*m* are also provided. They may also, if desired or necessary, be connected by a web.

Example 1: A mounting device, comprising a first bracket comprising a first leg of the first bracket, the first leg of the first bracket comprising a first notch and a second notch remote from the first notch, a second bracket comprising a first leg of the second bracket, and a locking arrangement attached to the first leg of the second bracket, the locking arrangement comprising a first pin having a first hole extending therethrough generally perpendicularly to a length dimension of the first pin, a second pin having a second hole extending therethrough generally perpendicularly to a length dimension of the second pin, an elongated member extending through the first hole and the second hole, and means for moving the first pin and the second pin toward and away from each other, the first pin being receivable in the first notch and the second pin being receivable in the second notch.

Example 2: The mounting device as set forth in example 1, wherein the moving means comprises a drawbolt having a threaded end and a headed end at an opposite end of the drawbolt from the threaded end, the first hole in the first pin being a threaded hole in which the threaded end is disposed, the drawbolt extending through the second hole so that the headed end of the drawbolt is disposed on a side of the second pin opposite from the first pin.

Example 3: The mounting device as set forth in example 2, wherein the locking arrangement comprises a third pin having a threaded hole in which the threaded end is disposed, the third pin being disposed between the first pin and the second pin along the drawbolt, and the first leg of the first bracket comprises a third notch between the first notch and the second notch.

Example 4: The mounting device as set forth in example 3, wherein the third notch includes a first portion extending in a longitudinal direction of the first leg of the first bracket and a second portion extending from a transverse edge of the first bracket to the first portion of the third notch.

Example 5: The mounting device as set forth in example 1, wherein the moving means comprises a quick-release bolt assembly comprising a bolt that extends through the first hole and the second hole, the bolt having a head at one end and a cam arrangement at an opposite end.

Example 6: The mounting device as set forth in example 1, wherein the second pin is positionally fixed relative to the first leg of the second bracket.

Example 7: The mounting device as set forth in example 1, wherein the first notch is disposed at a first end of the first leg of the first bracket.

Example 8: The mounting device as set forth in example 5, wherein the second notch is disposed at a second end of the first leg of the first bracket.

Example 9: The mounting device as set forth in example 1, wherein the first notch is disposed between and remote from first and second ends of the first leg of the first bracket.

Example 10: The mounting device as set forth in example 9, wherein the first notch includes a first portion extending in a longitudinal direction of the first leg of the first bracket and a second portion extending from a transverse edge of the first bracket to the first portion of the first notch.

Example 11: The mounting device as set forth in example 9, wherein the second notch is disposed between and remote from the first and second ends of the first leg of the first bracket.

Example 12: The mounting device as set forth in example 1, further comprising a mirror image first bracket comprising a first leg of the mirror image first bracket, the mirror image first leg of the first bracket being a mirror image of the first bracket and comprising a first notch and a second notch remote from the first notch, the first pin being receivable in the first notch of the mirror image first bracket and the second pin being receivable in the second notch of the mirror image first bracket.

Example 13: The mounting device as set forth in example 12, further comprising a mirror image second bracket, the mirror image second bracket being a mirror image of the second bracket and comprising a first leg of the mirror image second bracket, the locking arrangement being attached to the first leg of the mirror image second bracket.

Example 14: The mounting device as set forth in example 13, wherein the first leg of the second bracket is connected to the first leg of the mirror image second bracket by a web.

Example 15: The mounting device as set forth in example 13, wherein the elongated member of the locking arrangement is disposed the between the first leg of the second bracket and the first leg of the mirror image second bracket.

Example 16: The mounting device as set forth in example 15, wherein at least one of the first leg of the second bracket and the first leg of the mirror image second bracket is disposed between first leg of the first bracket and the first leg of the mirror image first bracket.

Example 17: The mounting device as set forth in example 15, wherein both the first leg of the second bracket and the first leg of the mirror image second bracket are disposed between first leg of the first bracket and the first leg of the mirror image first bracket.

Example 18: The mounting device as set forth in example 15, wherein both the first leg of the first bracket and the first leg of the mirror image first bracket are disposed between first leg of the second bracket and the first leg of the mirror image second bracket.

Example 19: The mounting device as set forth in example 12, wherein the first leg of the first bracket is connected to the first leg of the mirror image first bracket by a web.

Example 20. The mounting device as set forth in example 1, wherein at least one of the first bracket and the second bracket comprises a second leg extending at an angle relative to the at least one of the first leg of the first bracket and the first leg of the second bracket.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A mounting device, comprising:

a first bracket comprising a first leg of the first bracket, the first leg of the first bracket comprising a first notch and a second notch remote from the first notch;

a second bracket comprising a first leg of the second bracket; and a locking arrangement attached to the first leg of the second bracket, the locking arrangement comprising a first pin having a first hole extending therethrough generally perpendicularly to a length dimension of the first pin, a second pin having a second hole extending therethrough generally perpendicularly to a length dimension of the second pin, an elongated member extending through the first hole and the second hole, and means for moving the first pin and the second pin toward and away from each other, the first pin being receivable in the first notch and the second pin being receivable in the second notch;

wherein the second pin is positionally fixed relative to the first leg of the second bracket by being non-slidably disposed in a hole formed in the first leg of the second bracket.

2. The mounting device as set forth in claim 1, wherein the moving means comprises a drawbolt having a threaded end and a headed end at an opposite end of the drawbolt from the threaded end, the first hole in the first pin being a threaded hole in which the threaded end is disposed, the drawbolt extending through the second hole so that the headed end of the drawbolt is disposed on a side of the second pin opposite from the first pin.

3. The mounting device as set forth in claim 2, wherein the locking arrangement comprises a third pin having a threaded hole in which the threaded end is disposed, the third pin being disposed between the first pin and the second pin along the drawbolt, and the first leg of the first bracket comprises a third notch between the first notch and the second notch.

4. The mounting device as set forth in claim 3, wherein the third notch includes a first portion extending in a longitudinal direction of the first leg of the first bracket and a second portion extending from a transverse edge of the first bracket to the first portion of the third notch.

5. The mounting device as set forth in claim 1, wherein the moving means comprises a quick-release bolt assembly comprising a bolt that extends through the first hole and the second hole, the bolt having a head at one end and a cam arrangement at an opposite end.

6. The mounting device as set forth in claim 5, wherein the second notch is disposed at a second end of the first leg of the first bracket.

7. The mounting device as set forth in claim 1, wherein the first notch is disposed at a first end of the first leg of the first bracket.

8. The mounting device as set forth in claim 1, wherein the first notch is disposed between and remote from first and second ends of the first leg of the first bracket.

9. The mounting device as set forth in claim 8, wherein the first notch includes a first portion extending in a longitudinal direction of the first leg of the first bracket and a second portion extending from a transverse edge of the first bracket to the first portion of the first notch.

10. The mounting device as set forth in claim 8, wherein the second notch is disposed between and remote from the first and second ends of the first leg of the first bracket.

11. The mounting device as set forth in claim 1, further comprising a mirror image first bracket comprising a first leg of the mirror image first bracket, the mirror image first leg of the first bracket being a mirror image of the first bracket and comprising a first notch and a second notch remote from the first notch, the first pin being receivable in the first notch of the mirror image first bracket and the second pin being receivable in the second notch of the mirror image first bracket.

12. The mounting device as set forth in claim 11, wherein the first leg of the first bracket is connected to the first leg of the mirror image first bracket by a web.

13. The mounting device as set forth in claim 11, further comprising a mirror image second bracket, the mirror image second bracket being a mirror image of the second bracket and comprising a first leg of the mirror image second bracket, the locking arrangement being attached to the first leg of the mirror image second bracket.

14. The mounting device as set forth in claim 13, wherein the first leg of the second bracket is connected to the first leg of the mirror image second bracket by a web.

15. The mounting device as set forth in claim 13, wherein the elongated member of the locking arrangement is disposed the between the first leg of the second bracket and the first leg of the mirror image second bracket.

16. The mounting device as set forth in claim 15, wherein at least one of the first leg of the second bracket and the first leg of the mirror image second bracket is disposed between first leg of the first bracket and the first leg of the mirror image first bracket.

17. The mounting device as set forth in claim 15, wherein both the first leg of the second bracket and the first leg of the mirror image second bracket are disposed between first leg of the first bracket and the first leg of the mirror image first bracket.

18. The mounting device as set forth in claim 15, wherein both the first leg of the first bracket and the first leg of the mirror image first bracket are disposed between first leg of the second bracket and the first leg of the mirror image second bracket.

19. The mounting device as set forth in claim 1, wherein at least one of the first bracket and the second bracket comprises a second leg extending at an angle relative to the at least one of the first leg of the first bracket and the first leg of the second bracket.

* * * * *